July 27, 1948. R. W. KRAEMER ET AL 2,445,833
AIRPLANE WING FLAP AND DIVE BRAKE ASSEMBLY
Filed April 16, 1947 4 Sheets-Sheet 3
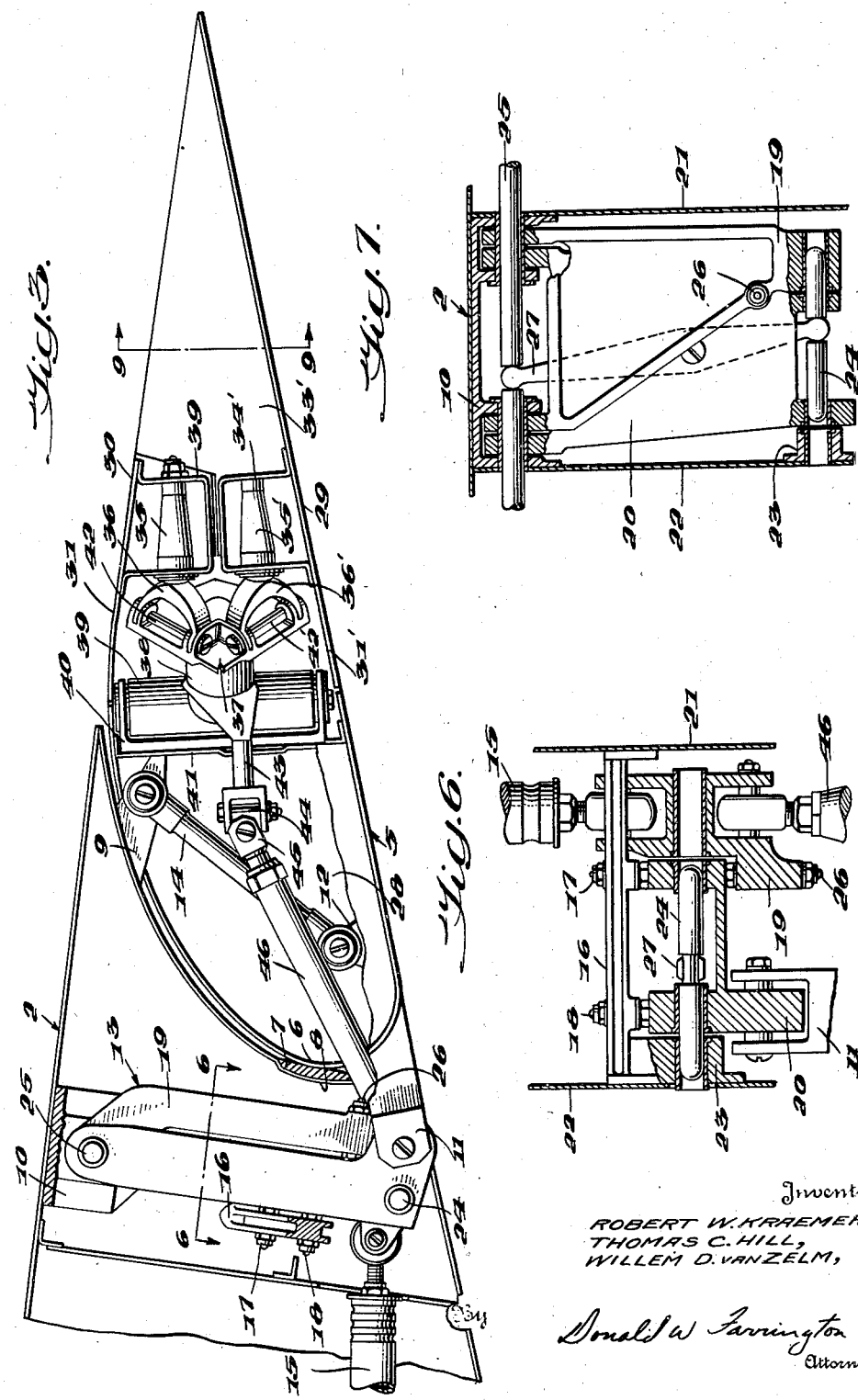
Inventors
ROBERT W. KRAEMER,
THOMAS C. HILL,
WILLEM D. VAN ZELM,
Donald W. Farrington
Attorney

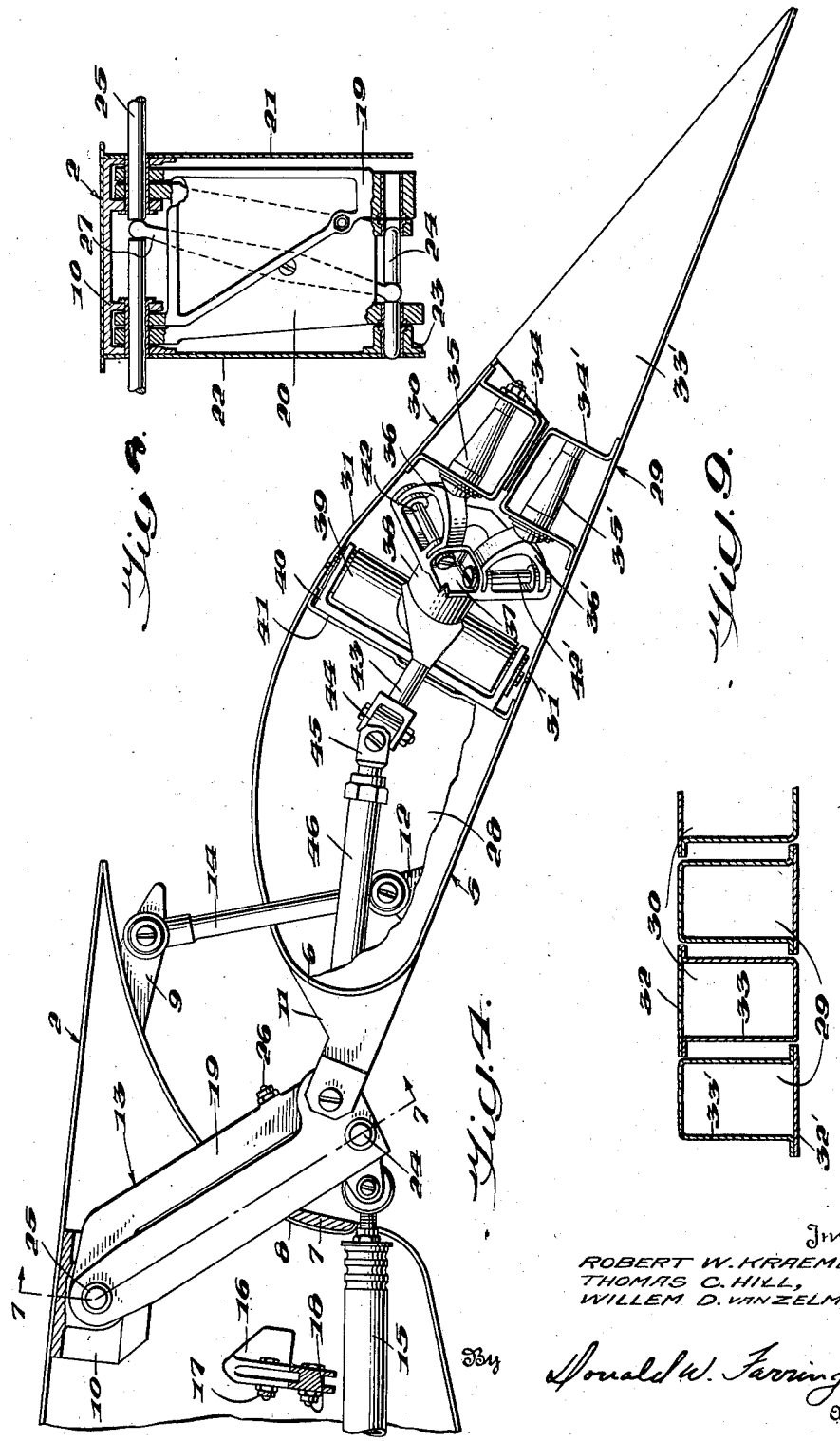

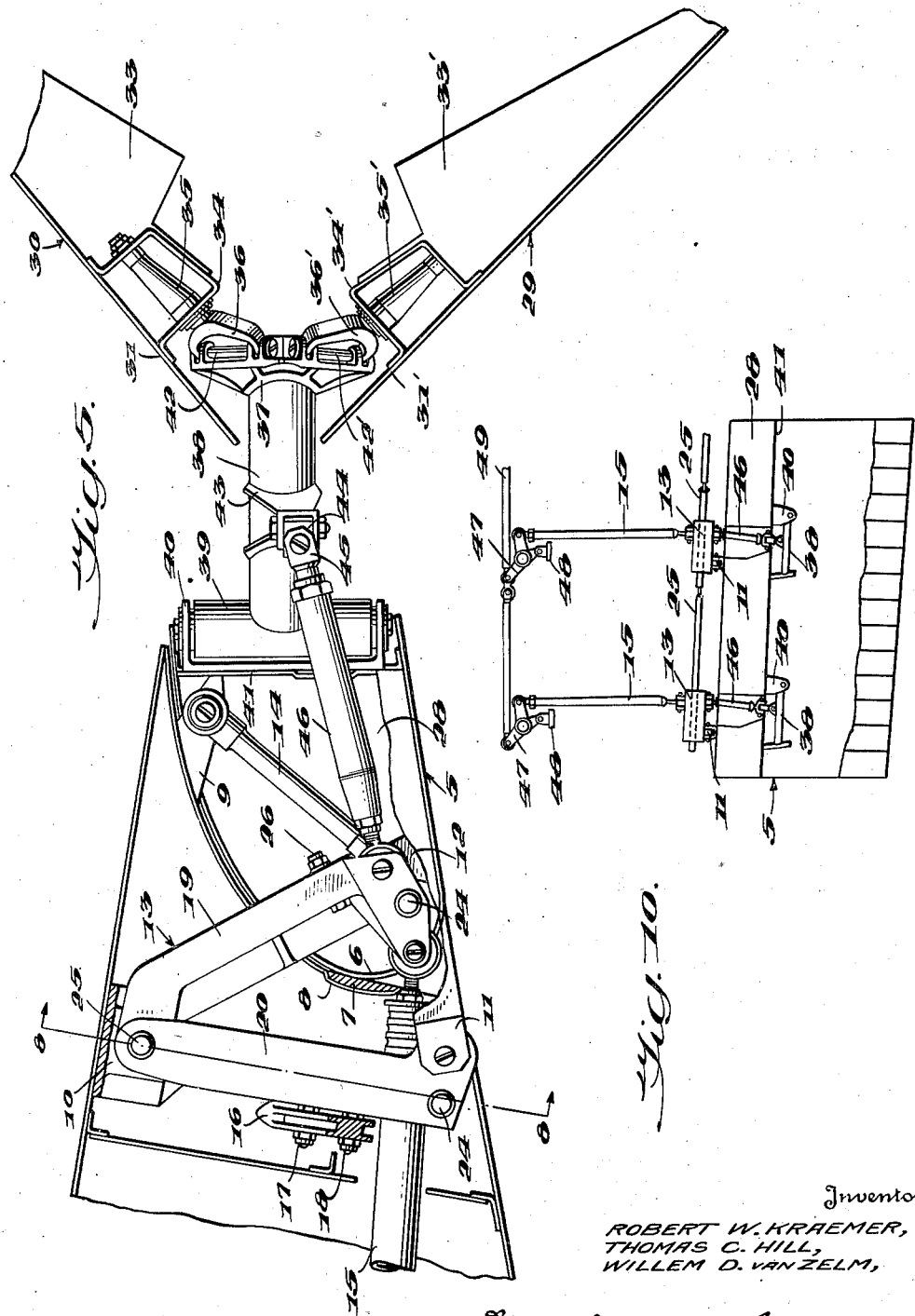

Patented July 27, 1948

2,445,833

UNITED STATES PATENT OFFICE 2,445,833

AIRPLANE WING FLAP AND DIVE BRAKE ASSEMBLY

Robert W. Kraemer, Middle River, Thomas C. Hill, Parkville, and Willem D. van Zelm, Ruxton, Md., assignors to The Glenn L. Martin Company, Middle River, Md., a corporation of Maryland Application April 16, 1947, Serial No. 741,714

8 Claims. (Cl. 244—42)

This invention relates to aerodynamic brakes structurally incorporated in the flaps of an airplane wing to give maximum effectiveness as a brake with a minimum of weight in the airplane. These brakes are particularly adapted to a dive bomber or torpedo bomber, but can, of course, be applied to any airplane where large deceleration control is desired.

Dive brakes have been used on the conventional dive bomber, but it is necessary for the conventional dive bomber to get almost directly over its target and dive almost straight down, with the brakes open, thus making an excellent target for antiaircraft fire during the entire time of the dive. If the conventional dive bomber approaches the target at about 15,000 feet and dives to about 2,000 feet, for the 13,000 foot dive the airplane is exposed to antiaircraft fire for a considerable length of time. The dive brakes take about twelve seconds to open and they retard the airplane during about two thirds of the dive. With the new dive brakes, the dive bomber can approach at higher altitudes, for example, 20,000 feet, and start a long shallow dive with the dive brakes closed and with very high speed. When the dive bomber is over its target, it can open its brakes in about three seconds for a very short final dive over the target, slacken the speed, release the bomb, and pull out of the dive so that the airplane is exposed to antiaircraft fire for a relatively short period of time. For torpedo bombing, the conventional dive bomber must approach the target at bombing level, in most cases, very close to the water surface when the target is a ship, and thus it is exposed to gun fire and water hazards for a long period of time. With the new dive brakes, it is possible for the dive bomber to swing down to the water surface in an arc and approach the target at a high speed of about 400 miles per hour. By operating the quick acting dive brakes, which can be opened in three seconds, the speed can be slackened to about 260 miles per hour to release the torpedo. The brakes can then quickly be closed and the airplane can make a quick climb for a getaway. To accomplish these above described desirable results, a more rugged and quicker acting, lighter weight dive brake was required as compared to known existing types of dive brakes. Due to great increases in the speed requirement from dive bombers, the dive brake had to be not only more effective as an aerodynamic brake, but it had to withstand greater forces and loads imposed upon it due to cutting down the opening time to a quarter of the previously existing dive brakes. To economize on weight, it was necessary to make structure forming the dive brake, also serve as structure for some other aerodynamic purpose in the airplane.

To accomplish the several desired results set forth above, the aerodynamic brake can be provided by using the rearward portion of a flap to provide structure for an aerodynamic brake. The rearward portion of the flap from behind the spar can be slit into two portions and hinged with respect to the nose portion of the flap. For most effective aerodynamic braking, the upper and lower skins at the trailing edge may be formed into finger-like portions so that when the brake portions are maintained in the extended or divergent positions, the fingers extend into the air stream and afford a high drag to provide the braking action. The fingers can be constructed to intermesh so that the fingers on one portion fill the gaps between the fingers on the other portion, thus providing a completed trailing edge by the intermeshing of the two brake portions in the retracted position. The brake portions may be locked to the nose portion when it is desired to extend the flap as a high lift device. When the parts are interlocked, a continuous airfoil is formed by the parts of the flap. When it is desired to use the aerodynamic brake, the nose portion of the flap may be locked against the trailing edge of the wing and the spar of the flap forms a fixed structure from which the brake portions may be hinged outwardly into the air stream. Any hinge mechanism on the upper and lower surfaces of the flap may be provided with a suitable toggle mechanism to extend the brakes into positions of high drag. In high speed aircraft, where great aerodynamic forces are encountered, other types of brake suspension and brake actuating mechanisms may be employed. Where the flow over the upper and lower surfaces of the wing is unequal, it is necessary to move the brakes into spaced relationship to the trailing edge of the wing to permit the flow to be equalized over the brake. Where great aerodynamic forces are encountered against which the brakes must be moved into the air stream, greater force exerting mechanisms, such as skewed axis linkages, can be employed.

It is an object of this invention to provide a structure on a flap for exerting a maximum of aerodynamic braking and an actuating mechanism therefor that will exert great force against the airflow over the structure.

It is a further object of this invention to provide a flap structure for conventional high lift purposes, part of which structure can be used as an aerodynamic brake for retarding the speed of the airplane.

It is a further object of this invention to provide a flap structure and aerodynamic brake structure in combination with controls therefor that may selectively operate the flap structure as a high lift device, or the brake structure as a deceleration device.

It is a further object of this invention to provide an airplane wing with a structure and controls therefor, which controls may actuate the structure to provide a high lift flap for the wing, or actuate portions of the structure as a high drag, or aerodynamic brake for the wing.

Further and other objects will become apparent from the description of the accompanying drawings which form a part of this disclosure and in which like numerals refer to like parts.

In the drawings:

Figure 3 is a sectional view through the wing and flap showing the controls therefor.

Figure 4 is a sectional view of the wing and flap showing the flap in the high lift position.

Figure 5 is a sectional view of the wing and flap showing the dive brakes in the operative position.

Figure 6 is a fragmentary sectional view through a section of the compound hinge taken on the line 6—6 of Figure 3.

Figure 7 is a section taken on line 7—7 of Figure 4.

Figure 8 is a section taken on line 8—8 of Figure 5.

Figure 9 is a section taken on line 9—9 of Figure 3.

Figure 10 is a plan view of the linkage assembly for one flap portion.

Figure 1:
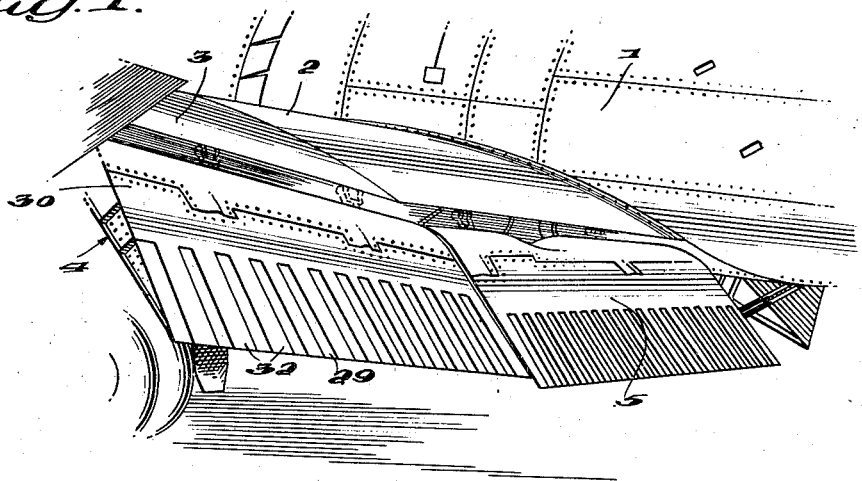
Figure 1 is a perspective view of an airplane wing showing the flap, with the dive brakes closed, in the high lift position.
Figure 2:
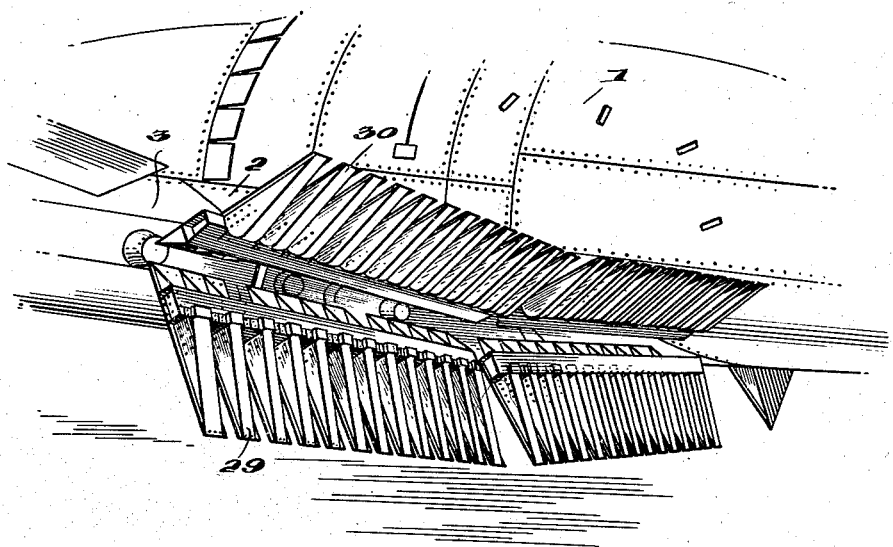
Figure 2 is a perspective view of the structure shown in Figure 1, with the dive brakes open.

In the fragmentary perspective views shown in Figures 1 and 2, for the purpose of illustrating the preferred form of the invention, the fuselage and wing arrangement of a carrier based dive bomber is shown. The fuselage is shown as 1 having the inner wing panel 2 attached thereto, and an outer wing panel 3 secured to inner wing panel 2 so that the outer wing panel may be folded for stowage of the airplane on an aircraft carrier. The flap structure 5 is shown attached to inner wing panel 2 and flap structure 4 is shown attached to outer wing panel 3. In Figure 1, the flap is shown extended from the wing portions 2 and 3 in the high lift position. In Figure 2, the trailing edges of the flap sections are shown extended into the high drag position, which will be subsequently described in structure and function in more detail.

Figure 3 may be considered as a typical section through either wing portions 2 or 3. Wing portion 2 is shown having flap 5 movably secured to the trailing edge thereof, and so formed that in the retracted position, shown in Figure 3, the upper and lower surfaces of the wing and flap are co-extensive to form a smooth and continuous high speed wing. The nose of flap 5 shown at 6 abuts against a resilient seal 7, which is mounted in the trailing edge portion 8 of wing portion 2 to provide an aerodynamic seal to prevent air flow between the upper and lower surfaces, so that the flap and wing effectively form a high speed wing when the flap is retracted.

The mounting and support of flap 5 is best shown in Figure 4. Bracket 9 is secured to the trailing edge of wing portion 2. Bracket 10 is secured within the wing adjacent the trailing edge thereof. Bracket 11 is secured to the nose or leading edge of the flap. Bracket 12 is secured within the leading edge of the flap. The compound linkage, generally indicated as 13, forms a connecting link between brackets 10 and 11, and link 14 forms a fixed link between brackets 9 and 12. The location of the pivot points and the brackets, and the lengths of the linkages are selected to determine the position of the flap with respect to the wing. These positions are the result of the aerodynamic considerations derived from the cooperation of the flap with the wing for various lift conditions. The linkages are so designed as to effect the desired relative movement of the flap and wing. Chordwise push-pull rod 15 is the last link of a system of linkages operated by the pilot, preferably by means of a hydraulic cylinder, to exert the force required to move the flap or brake to the operative position. Bracket 16 is mounted on the airplane wing structure and affords a stop for compound linkage 13 which determines the relative position of the flap and wing in the retracted position. Stop bolts 17 and 18 on bracket 16 provide a fine adjustment of the components of compound linkage 13 to position the flap relative to the wing. It can be seen from a consideration of Figures 3 and 4 that as push-pull rod 15 moves to the right, flap 5, supported by linkages 13 and 14, moves rearwardly and downwardly away from the trailing edge of wing 2, to a position of high lift. As push-pull rod 15 is moved to the left, the flap is retracted on linkages 13 and 14 until linkage 13 comes to rest against bracket 16, and the nose 6 of flap 5 engages seal 7.

Compound linkage 13 is shown in more detail in Figures 5, 6, 7 and 8. Linkage 13 comprises two members 19 and 20 pivoted at 25 on bracket 10. Member 19 is the dive brake idler linkage, and member 20 is the flap suspension linkage. The rib structure of wing portion 2 is shown at 21 and 22. A lock pin bushing is shown at 23 mounted in rib structure 22. Lock pin 24 is shown in Figures 6 and 8 in a position to lock the flap suspension link 20 to the rib structure 22. Upon movement of member 25, which serves as a pivot and push rod in bracket 10, walking beam 27 moves locking pin 24. The ends of walking beam 27 are forked as shown in Figure 6 to fit around reduced portions of members 24 and 25 to effect sliding motion thereof. Pin 24 is shown in Figures 6 and 8 locking flap suspension link 20 to the rib structure 22 of the wing, and in Figure 7 pin 24 has been moved to a position that locks members 19 and 20 so that they will move together. When members 19 and 20 are locked together so that compound linkage 13 moves as a unit, motion of push rod 15 causes the flap to be moved as shown in Figure 4. When locking pin 24 is moved to the left, to lock member 20 relative to the airplane wing structure 22, the motion of the push rod 15 moves only portion 19 and the dive brake is then actuated in a manner that will be subsequently described.

Flap 5 consists of a forward or nose section 28 and a rearward section including brake members 29 and 30. Member 30 consists of an outer skin 31, cut out to form fingers 32, shown in Figure 1, which fingers are reinforced by tapered channels 33 secured to the underside of each finger. Member 29 is formed in a similar manner, having outer skin 31' cut away to form fingers 32', which are reinforced by tapered channels 33'. As shown in Figures 1 and 9, the fingers interlock in their retracted position to form the tapered trailing edge of the flap. Outer skins 31 and 31' extend from the trailing edge of nose portion 28 to form therewith in the retracted position a continuous smooth contoured airfoil to act as a flap. Brackets 34 and 34' are secured to the underside of skins 31 and 31' to afford a support for pivot pins 35 and 35'. The forward ends of pins 35 and 35' are secured to brackets 36 and 36', which are pivotally secured to bracket 37 on the end of arm 38. The other end of arm 38 is rigidly secured to post 39 which is pivotally supported for turning about a vertical axis in bracket 40. Bracket 40 is secured to a spar structure 41 in member 28. Bracket 37 is rigidly secured to 38 and is formed to support pins 42 and 42' on skewed axes. Pins 35 and 35' are pivotally supported in brackets 34 and 34' and extend in a chordwise direction. It can be seen from a consideration of Figures 3 and 5 that as arm 38 rotates about the vertical pivotal axis of post 39, members 35 and 35', being constrained to chordwise planes, assume diverging angular positions, and the portions of the dive brake attached thereto are moved similar to blades of a scissors. In other words, looking at the action of the mechanism shown in Figure 5 from the top, as arm 38 is moved in a counterclockwise direction about post 39, members 29 and 30 will move from the retracted position to an angular position proportionate to the angular motion of arm 38. In reverse, as arm 38 is moved in a clockwise direction, members 29 and 30 will be retracted and assume the position shown in Figure 3 where they form with the nose portion of the flap a continuous aerodynamic flap structure. Bracket 43 is secured to the mid portion of arm 38 to support a universal connection 44 to which bracket 45 on the end of dive brake push-pull rod 46 is attached. Push-pull rod 46 is shown in Figure 6 connected to the lower end of dive brake idler 19. It can be seen from further consideration of Figure 6 that when the locking pin 24 secures member 20 to the airplane structure so that only member 19 is moved upon movement of push-pull rod 15, member 46, which is pivotally secured to the lower end of dive brake idler 19, is always moved when push-pull rod 15 is actuated. Whether motion of push-pull rods 15 and 46 opens the dive brakes or not depends upon whether or not member 20, to which the forward portion 28 of the flap is secured, moves upon motion of the push rod 15.

Figure 10 shows the interconnection of the mechanism described above to the actuating system. Compound linkage 13 is shown pivoted on member 25 which acts as a pivot pin and push rod to actuate the locking pin through walking beam 27. Pin 25 may be articulated as the contour of the wing requires, but effectively forms a series of push rods and pivot pins for each compound linkage 13. Flap 5 is shown schematically having a forward portion 28 terminating in spar 41 to which is attached bracket 40. Arm 38 is shown pivoted to bracket 40. Push-pull rod 46 is shown connected through compound linkage 13 to push-pull rod 15. Bracket 11 is shown connecting leading edge portion 28 of the flap to compound linkage 13. The other ends of push-pull rods 15 are secured to bell cranks 47 supported on brackets 48 secured to the airplane structure. Articulated push-pull rod 49 is pivotally secured to the bell cranks so that upon motion of rod 49 to the right, push-pull rod 15 will be moved rearwardly of the wing to actuate member 5 as a flap, if rod 25 has been moved to the left to move locking pin 24 to the right to lock members 19 and 20 for simultaneous motion as shown in Figure 4, or as a dive brake, if locking pin 24 is moved to the left, as shown in Figure 8.

The operation of the structural addition to the trailing edge of the wing as a flap or dive brake is as follows:

When it is desired to operate the above described structure as a high lift device, member 25 is moved to the left, which moves locking pin 24 to the right to lock members 19 and 20 together for simultaneous motion. Upon movement of push-pull rod 49 to the right, push-pull rods 15, connected to bell cranks 47, are moved rearwardly of the wing. Push-pull rod 15 moves compound linkage 13, including members 19 and 20, and the flap suspended from the wing by members 13 and 14, moves rearwardly and downwardly to a position of high lift.

When it is desired to actuate the structure described above as an aerodynamic brake for the wing, member 25 is moved to the right to move pin 24 to the left to lock member 20 to the airplane rib structure 22. Member 19 is free to move independently of member 20. The forward portion of the flap 28, however, is secured by bracket 11 to the lower portion of member 20, so that portion 28 of the flap is rigidly fixed relative to the wing by linkages 20 and 14 when locking pin 24 is moved to the left. When member 49 is moved to the right to actuate push-pull rods 15, only member 19 of the compound linkage 13 is moved. The motion of push-pull rod 15 is transmitted through member 19 to push-pull rod 46, which in turn rotates arms 38 about vertical axes in brackets 40, secured to the trailing edge of member 28. As arms 38 are moved in a counterclockwise direction, pivot members 35 and 35', being restrained in chordwise planes, open the dive brakes since they are connected through members 36 to skewed axes pivots, 42 and 42'.

It should be noted from the above description that locking pin 24 is effective to lock the two brake portions and the nose portion of the flap structure together when it is moved to the right so that the flap operates as a unitary structure, or that locking pin 24, upon motion to the left, locks the nose portion of the flap and the trailing edge of the wing together as a unitary structure and frees the brake portions of the flap for movement into an aerodynamic brake portion.

It is to be understood that certain changes, alterations, modifications and substitutions can be made without departing from the spirit and scope of the appended claims.

We claim as our invention:

1. An airfoil for an airplane wing comprising a member having a spar, a nose portion secured to said spar, a trailing edge portion rearwardly of said spar comprising two sections each having finger-like projections that intermesh, one group of fingers filling the spaces between the fingers of the group on the other section to form a complete surface, linkage means movably interconnecting a wing and the nose portion of said airfoil to support the airfoil in positions of high lift relative to a wing, other linkage means to move said trailing sections of said airfoil into positions of high drag, a push-pull rod mounted in a wing to move said sections, interlocking means movable to one position to lock said nose portion to said finger sections for simultaneous movement therewith for flap action and movable to another position to lock said nose portion to a wing structure while said finger sections are moved to a high drag position.

2. An airfoil for an airplane wing including a member comprising a nose portion and a trailing edge portion, the trailing edge portion being divided into an upper brake section and a lower brake section, each brake section having finger-like portions that intermesh, one group of fingers filling the spaces between the fingers on the other section to form a complete aerodynamic surface, linkage means forming a support and hinge for the brake sections on said nose portions, said nose portion of the airfoil being movably supported on the trailing edge of a wing by two spaced linkage systems, one of said linkage systems including a compound linkage consisting of a brake and an airfoil linkage, a push-pull rod mounted in an airplane wing being connected to one end of the brake linkage, a second linkage connected to the same end of the brake linkage and the brake actuating mechanism, the other member of the compound linkage being connected to the nose portion, a locking pin mounted in one of the compound linkages to selectively lock the two members of the compound linkage together so that upon motion of the push rod all portions of the airfoil will move together into a position of high lift, and upon opposite motion of said pin, the airfoil suspension portion of the compound linkage will be locked to an airplane wing structure to maintain the nose portion in the fixed position relative to a wing and free the brake member of a compound linkage so that upon movement of the push-pull rod, said linkage secured thereto will move the brake portions into a position of high drag.

3. An airplane wing including an airfoil along the trailing edge thereof, said airfoil including two sections hingedly mounted with respect to said trailing edge, each section having finger-like projections that intermesh, one group of fingers filling the spaces between the fingers of the group on the other section to form a complete and continuous trailing edge of said wing, linkage means to spread the sections so that the finger-like portions project into the air stream above and below said wing to afford high aerodynamic drag.

4. A flap structure for an airplane wing including an airfoil-shaped member having a spar and a nose portion secured to said spar, a trailing edge portion rearwardly of said spar comprising two sections, each having finger-like projections that intermesh, one group of fingers filling the spaces between the fingers of the group on the other section to form a complete airfoil surface, said sections being movably mounted with respect to said nose portion, a linkage mechanism comprising an arm having one end pivotally mounted on said spar to turn about a vertical axis in a horizontal plane, the other end having pins mounted in said sections and extending longitudinally thereof and hinged to said arm to turn about axes so inclined that upon motion of said arm about said vertical axis in a horizontal plane, said pins being mounted in said sections in a position restraining them to motion in a vertical plane, will diverge upon motion of said arm and spread said sections into positions of high drag as they extend into the air stream above and below a wing.

5. The flap structure for an airplane wing comprising an airfoil-shaped member having a spar, a nose portion secured to said spar, a trailing edge portion rearwardly of said spar comprising two portions each having finger-like projections that intermesh, one group of fingers filling the space between the group of fingers on the other portion to form a complete airfoil surface, a plurality of linkage means movably interconnecting a wing and the nose portion of said flap to support the flap in positions of high lift relative to a wing, a plurality of linkage means to move said finger-like portions of said flap into positions of high drag, a push-pull rod system mounted in a wing to move said finger-like portions, locking means to secure said nose portion to said finger-like portions for simultaneous movement therewith for flap action and other locking means to secure said nose portion to a wing structure while said finger-like portions are moved to a high drag position.

6. An airplane wing structure including an airfoil-shaped assembly, said airfoil-shaped assembly comprising a nose portion and a trailing edge portion, the trailing edge portion being divided into an upper brake member and a lower brake member, each brake member having finger-like portions that intermesh, one group of fingers filling the spaces between the fingers on the other member to form a complete airfoil surface, linkage means forming a support and actuator for the nose portion and said trailing edge portions, locking means to secure said nose portion and said trailing edge portions together for simultaneous motion to a position of high lift to the rear of the wing structure, other locking means to secure said nose portion to the rear edge of the wing as said linkage means moves said brake members into the air stream above and below said wing structure into positions of high drag.

7. An airfoil for an airplane wing comprising a nose portion pivoted for motion relative to a wing, and a trailing edge portion rearwardly of said nose portion comprising two sections, each having finger-like projections that intermesh, one group of fingers filling the spaces between the fingers of the group on the other section to form a complete surface, linkage means movably interconnecting a wing and the nose portion of said airfoil to support the airfoil in positions of high lift relative to a wing, other linkage means to move said trailing sections of said airfoil into positions of high drag, a push-pull rod mounted in a wing to move said sections, locking means movable to one position to lock said nose portion to said finger sections for simultaneous movement therewith for flap action, and movable to another position to lock said nose portion to a wing structure while said finger sections are moved to a high drag position.

8. An airfoil for an airplane wing including a member comprising a nose portion and a trailing edge portion, the trailing edge portion being divided into an upper brake section and a lower brake section, each brake section having finger-like portions that intermesh, one group of fingers filling the spaces between the fingers on the other section to form a complete aerodynamic surface, linkage means forming a support and hinge for the brake sections on said nose portion, said nose portion of the airfoil being movably supported on the trailing edge of a wing by two spaced linkage systems, one of said linkage systems including a compound linkage consisting of a brake linkage and an airfoil linkage, the upper ends of said linkages being pivoted on hollow sleeves, a lock actuating push-pull rod extending through said sleeves, a power push-pull rod mounted in an airplane wing being connected to the lower end of the brake linkage, a second rod connected to the same end of the brake linkage and the brake actuating mechanism, the other member of the compound linkage being pivoted on said nose portion, a locking pin mounted in the lower end of the compound linkages actuated by said first mentioned push-pull rod to selectively lock the two members of the compound linkage together so that upon motion of said power push-pull rod, all portions of the airfoil will move together into a position of high lift, and upon opposite motion of said pin, the airfoil suspension portion of the compound linkage will be locked to an airplane wing structure to maintain the nose portion in the fixed position relative to a wing and free the brake member of the compound linkage so that upon movement of the push-pull rod, said linkage secured thereto will move the brake portions into a position of high drag.

ROBERT W. KRAEMER.
THOMAS C. HILL.
WILLEM D. van ZELM.